(12) United States Patent
Pereira

(10) Patent No.: US 10,507,805 B2
(45) Date of Patent: Dec. 17, 2019

(54) LOTUS EFFECT WASHING MACHINE

(71) Applicant: Alstom Transport Technologies, Saint-Ouen (FR)

(72) Inventor: Jorge Pereira, Bizrritz (FR)

(73) Assignee: Alstom Transport Technologies, Saint-Ouen (FR)

( * ) Notice: Subject to any disclaimer, the term of this patent is extended or adjusted under 35 U.S.C. 154(b) by 175 days.

(21) Appl. No.: 15/443,288

(22) Filed: Feb. 27, 2017

(65) Prior Publication Data

US 2017/0259790 A1  Sep. 14, 2017

(30) Foreign Application Priority Data

Mar. 9, 2016 (FR) .................................. 16 51973

(51) Int. Cl.
| | | |
|---|---|---|
| *B60S 3/00* | (2006.01) | |
| *C09K 3/18* | (2006.01) | |
| *B08B 5/02* | (2006.01) | |
| *B08B 7/04* | (2006.01) | |
| *B08B 3/14* | (2006.01) | |
| *B08B 7/00* | (2006.01) | |
| *B60S 3/04* | (2006.01) | |

(52) U.S. Cl.
CPC ............... *B60S 3/006* (2013.01); *B08B 3/14* (2013.01); *B08B 5/02* (2013.01); *B08B 7/0014* (2013.01); *B08B 7/04* (2013.01); *B60S 3/04* (2013.01); *C09K 3/18* (2013.01)

(58) Field of Classification Search
CPC .......... B08B 3/14; B08B 5/02; B08B 7/0014; B08B 7/04; B60S 3/04; B60S 3/006; C09K 3/18
See application file for complete search history.

(56) References Cited

U.S. PATENT DOCUMENTS

| | | | | | |
|---|---|---|---|---|---|
| 2,139,096 | A | * | 12/1938 | Piquerez ................... | B60S 3/00 134/104.4 |
| 4,977,912 | A | | 12/1990 | Oota et al. | |
| 5,033,489 | A | * | 7/1991 | Ferre ....................... | B60S 3/002 134/107 |
| 5,255,695 | A | * | 10/1993 | Downey ................... | B60S 3/04 134/123 |
| 2002/0002987 | A1 | * | 1/2002 | Jones ....................... | B60S 3/04 134/18 |

(Continued)

FOREIGN PATENT DOCUMENTS

| | | |
|---|---|---|
| DE | 19607160 A1 | 8/1997 |
| EP | 0180253 A2 | 5/1986 |
| FR | 1403838 A | 6/1965 |

OTHER PUBLICATIONS

French Search Report dated Nov. 4, 2016 issued in corresponding French Patent Application No. 1651973.

*Primary Examiner* — Benjamin L Osterhout
(74) *Attorney, Agent, or Firm* — Troutman Sanders LLP

(57) ABSTRACT

This washing machine for a railway vehicle includes a water texturing system, mixing water with particles able to produce textured water having super-hydrophoby properties making it possible to implement a lotus cleaning effect on the surface on which the textured water flows; a textured water spraying system, fed by the water texturing system and using at least one appropriate spraying device to spray the textured water on a surface of the railway vehicle to be cleaned.

6 Claims, 1 Drawing Sheet

(56) References Cited

U.S. PATENT DOCUMENTS

| | | | |
|---|---|---|---|
| 2003/0047201 A1* | 3/2003 | Kaipainen | B60S 3/04 134/148 |
| 2003/0213502 A1* | 11/2003 | Eriksson | C02F 9/00 134/10 |
| 2004/0221878 A1* | 11/2004 | Johnson | B60S 3/04 134/56 R |
| 2006/0060217 A1* | 3/2006 | Wilsey | B08B 7/0092 134/18 |
| 2006/0157094 A1* | 7/2006 | Zeile | B08B 17/00 134/123 |
| 2009/0272409 A1* | 11/2009 | Petit | B60S 3/002 134/32 |
| 2010/0206341 A1* | 8/2010 | Essenburg | B60S 3/00 134/45 |
| 2011/0197935 A1* | 8/2011 | Belanger | B60S 3/04 134/123 |
| 2013/0098403 A1* | 4/2013 | Zeile | B08B 3/00 134/18 |
| 2014/0076366 A1* | 3/2014 | Belanger | B60S 3/04 134/34 |
| 2015/0059812 A1* | 3/2015 | Petter | B60S 3/04 134/123 |

* cited by examiner

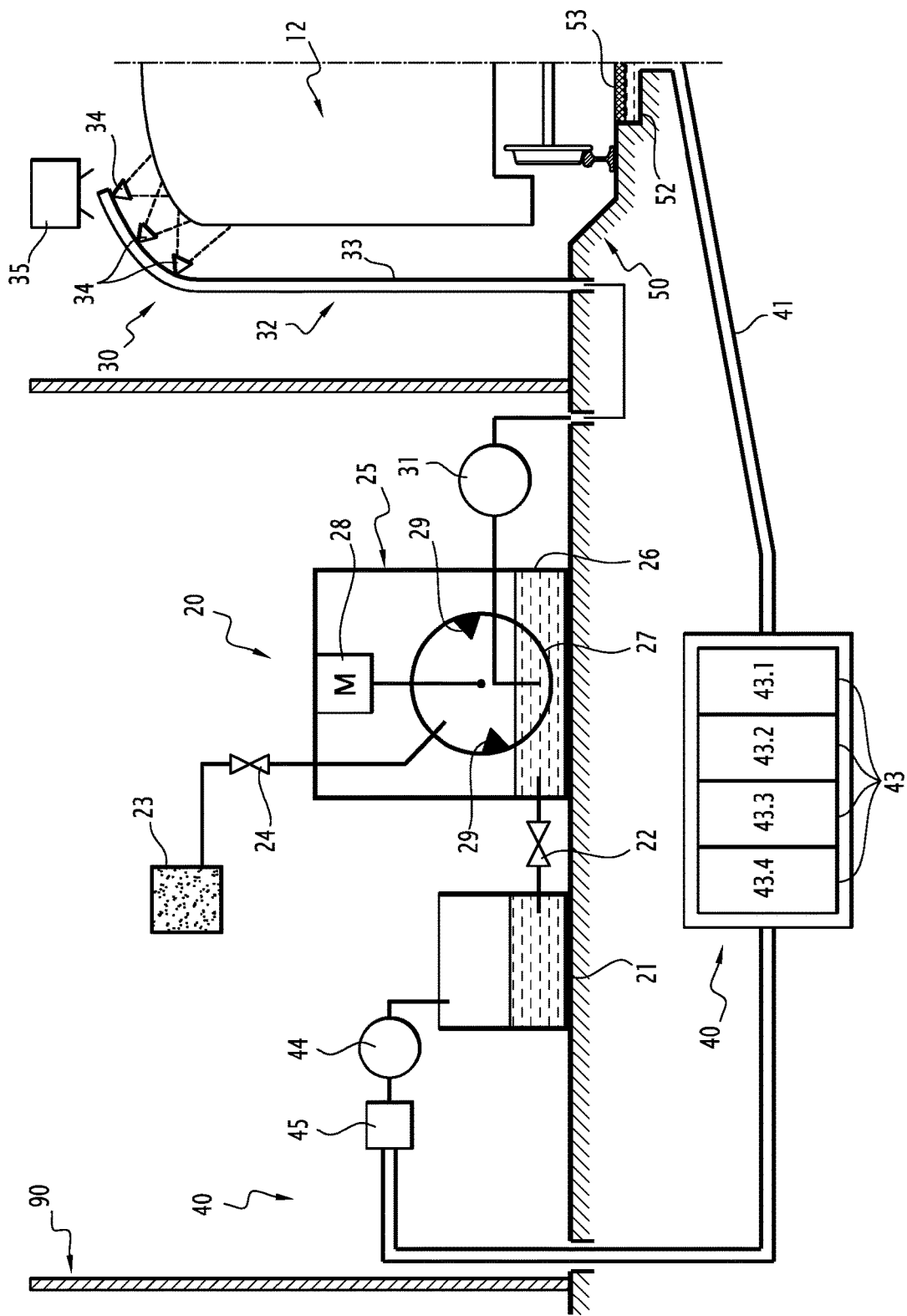

LOTUS EFFECT WASHING MACHINE

CROSS-REFERENCE TO RELATED APPLICATION

This application claims priority to French Application No. FR 16 51973 filed Mar. 9, 2016. The entirety of this application is incorporated herein by reference in its entirety.

FIELD OF THE INVENTION

The present invention relates to a washing machine for rail vehicles.

BACKGROUND

In the railroad field, to clean vehicle bodies, "conveyor" washing machines (the train moving through the washing machine as it is washed) and "stop and go" washing machines (the train stopping in front of the washing machine to be washed, and then leaving) are known, successively including, along a washing track on which a vehicle to be washed moves: a system for detecting the presence of a vehicle; at least one pre-wetting device and a device for spraying a washing product; a brushing device; and a rinsing and drying device.

The pre-wetting device, including a plurality of arches, is installed at the entrance to the washing track and sprays clean water, which comes from a clean water reservoir advantageously supplied by a water recycling system. This corresponds to a pre-wetting step.

The device for spraying a washing product sprays a product obtained by mixing clean water and soap. This device is installed after the pre-wetting device and allows pressurized spraying of water and soap over the entire vehicle. This corresponds to a pressurized wetting step.

The brushing device is then actuated. It is made up of a set of rotary brushes that mechanically clean the wetted surface of the vehicle to remove dirt.

Lastly, the rinsing device is installed before the exit from the washing track. It includes a plurality of rinsing arches, in particular a rinsing arch with clean water and a rinsing arch with softened water. This corresponds to a pressurized rinse phase of the vehicle body.

Lastly, a drying device makes it possible to dry the vehicle by spraying hot air.

The machine works automatically once the presence of a vehicle is detected in a so-called "wash" zone.

The machine includes a technical room equipped with a monitoring and remote control console for the washing machine.

Such machines consume large quantities of water. Furthermore, the mechanical contact of the brushes on the body of the vehicle tends to scratch the latter, and consequently reduce its lifetime. Furthermore, the washing brushes of the washing machine deteriorate quickly. Lastly, at the end of washing, after drying, white lines may appear on the washed body.

SUMMARY

The invention therefore aims to resolve this problem.

To that end, the invention relates to a washing machine for a railway vehicle, characterized in that it includes: a water texturing system, mixing water with particles able to produce textured water having super-hydrophoby properties; a textured water spraying system, fed by the water texturing system and using at least one appropriate spraying device to spray the textured water on a surface of the railway vehicle to be cleaned.

The lotus effect is known, which is a large-scale hydrophoby phenomenon, also called super-hydrophoby, caused by a micro or nanometric roughness on the surface of a solid and resulting in a drop of water deposited on such a surface not wetting that surface, but retaining a shape close to a spherical drop of water. Its name comes from the lotus, whose leaves have this feature. The lotus effect gives the surface of the solid self-cleaning capabilities, since a drop of water does not adhere to that surface and instead flows, carrying the dust and particles found on said surface with it.

The conjugated approach, called water texturing, has also recently been studied. In the article by D. Quéré, "Les surfaces super-hydrophobe" [Super-hydrophoby surfaces], downloadable online at http://www.cnrs.fr/publications/imagesdelaphysique/couv-PDF/IdP2005/37Quere.pdf, the author states that "a different strategy for obtaining an ultra-hydrophoby state consists of texturing the liquid, rather than the solid. This can be achieved by trying to mix a hydrophoby powder with water. The powder (microbeads of fluorinated glass, lycopodiums or soot) is not incorporated into the water, but migrates to its surface, where it forms a sort of skin, made up of a single layer of grains. If this coated drop is transferred onto any solid (for example, glass or a plastic), it no longer touches this substrate (due to the grains) and therefore achieves a strictly non-wetting state—with a contact angle of 180°, which no longer depends on the nature of the substrate (figure 4). Such an object is called a liquid bead."

According to particular embodiments, the machine comprises one or more of the following features, considered alone or according to any technically possible combinations:

- the water texturing system includes a clean water reservoir and a particle container, as well as a water texturing machine capable of mixing the clean water with particles to produce textured water.
- the water texturing machine includes a tank, the bottom of which is filled with clean water, and a drum, rotated using a motor, and one wall of which is provided with cells allowing the water to circulate between the inside and the outside of the drum, the particles being introduced from the container to the inside of the drum, the cells being smaller than the particles so as to keep the particles inside the drum.
- the spraying system includes a plurality of spray bars.
- each spraying device includes an air spraying system able to spray hot air or cold air, optionally pulsed.
- the washing machine not including mechanical washing means.
- the washing machine includes a dirty textured water recovery system.
- the recovery system includes decanting tubs and a set of filters making it possible to filter the water collected in the decanting tub to supply the water texturing system with clean water.
- the textured water makes it possible to carry out a lotus effect to clean the surface on which the textured water flows.

BRIEF DESCRIPTION OF THE DRAWING

The invention and its advantages will be better understood upon reading the following detailed description of one specific embodiment, provided solely as a non-limiting example, this description being done in reference to the sole appended figure, in which, FIG. 1 shows a schematic illustration of a washing machine according to the invention.

DETAILED DESCRIPTION

The washing machine 10 includes a technical room 90, a water texturing system 20, a system for spraying textured water 30 on a railway vehicle 12 to be cleaned and a dirty textured water recovery system 40.

The water texturing system 20 serves to produce textured water by mixing appropriate particles with clean water.

The system 20 thus includes a clean water reservoir 21 and a water injection device 22 for injecting clean water taken from the reservoir 21 inside a water texturing machine 25.

The water contained in the reservoir 21 is recycled water in the present embodiment. Alternatively or in combination, the water from the reservoir 21 is municipal water and/or rainwater. In still another alternative, independent from the previous alternatives, the water from the reservoir 21 is soapy, i.e., soap is added to clean water.

Furthermore, the system 20 includes a container 23 forming a reserve of texturing particles assuming the form of a powder.

The particles used are for example microbeads of fluorinated glass.

A particle introduction device 24 makes it possible to introduce an appropriate quantity of powder into the texturing machine 25 with respect to the volume of clean water that it includes.

The water texturing machine includes a stainless steel tank 26, the bottom of which is filled with water.

The water texturing machine 25 also includes a cylindrical drum 27, able to be rotated by an electric motor 28 with which the machine 25 is equipped. The drum 27 is a stainless steel cylinder, the radial wall of which has cells allowing the water located at the bottom of the tank 26 to penetrate inside the drum 27. The particle introduction device 24 emerges inside the drum 27 so as to pour the texturing particles therein. The size of the cells of the drum 27 is smaller than the size of the texturing particles. In this way, the texturing particles are confined to the inside of the drum 27.

The drum is provided with one or several blades 29 making it possible, when the drum 27 is rotated, to mix the water and the particles found inside the drum 27. The blades 29 placed inside the drum make it possible to increase the mechanical energy of the mixing necessary to textured the water.

Advantageously, the drum 27 is provided with an access hatch allowing maintenance of the drum.

The textured water spraying system 30 includes a pump 31 able to suction textured water from the inside of the drum 27 of the machine 25 and to discharge the textured water toward a set of spray bars 32 positioned along a washing track 50.

A spray bar 32 of the textured water spraying system 30 includes a textured water distribution line 33 and a plurality of nozzles 34, positioned along the line 33. Each nozzle 34 makes it possible to spray textured water.

The position of each bar 32 along the washing track 50, as well as, for each bar 32, the shape of the line 33 and the position of each nozzle 34 along the line, as well as its orientation, are suitable for spraying textured water on the body of the railway vehicle to be cleaned 12, stopped on the cleaning track 50, so as to maximize the lotus effect of the textured water.

For example, one bar is provided at the entrance to the washing track, another in the middle of the washing track, and still another at the exit from the washing track.

For example, the nozzles are placed at a height and oriented so as to pour, rather than spray, textured water on the edge of the roof of the vehicle, so that it streams along the side wall of the body.

Advantageously, the spraying system 30 includes an air spraying device 35. For example, each spray bar 32 is associated with an air spraying device 35.

The air spraying means makes it possible to spray cold air, preferably in a pulsed form. Alternatively, the air spraying device sprays hot air, which may or may not be pulsed.

The air spraying device has the advantage of accentuating the lotus effect.

Furthermore, because the drops of textured water tend to bounce, the pressure at the outlet of the nozzles is limited so that the kinetic energy of the textured water drops is reduced and the drops slide over the body of the vehicle 12.

The physical effect implemented along the body of the railway vehicle is as follows. The sprayed textured water having an extremely low wetting, it slides over the surface of the body under the effect of gravity and its kinetic spraying energy (due both to the pressure in the spray bar and, optionally, the cold air of the moving air curtain, created by the air spraying device).

As the drops of textured water move over the surface of the body, they encounter the dirt present on the surface.

Under the effect of successive impacts with the drops of textured water, dirt is ultimately loosened from the surface and carried by the stream of textured water toward the floor of the washing track.

The machine 10 lastly includes a dirty textured water recovery system 40. The textured water sprayed on the body of the vehicle 12 flows along the body toward the floor of the washing track 50. The latter is provided with a central gutter 52, for example positioned between the lines of rails of the washing track, and is inclined to allow the dirty textured water 40 to flow toward the central gutter 52.

The recovery system 40 then includes a discharge line 41 that drains the dirty textured water recovered via the washing track 50 and the central gutter 52 (covered with grating 53) so as to return it to decanting tubs 43 of the recovery system 40.

The dirty textured water poured by gravity into the decanting tubs 43 rests there such that the texturing particles are deposited at the bottom of the tubs 43 with the dirt recovered on the body of the vehicle 12.

Alternatively, the recovery system 40 is provided with a pump making it possible to suction the dirty textured water present in the gutter 52 so as to return it to decanting tubs 43 of the recovery system 40.

The dirty textured water passes, by overflow, from one decanting tub to another, from the first tub 43-1 to the second tub 43-2, from the second tub 43-2 to the third 43-3, and from the third 43-3 to the fourth 43-4.

One of the decanting tubs 43, for example the third tub 42-3, is equipped with a grate having a specific pitch that makes it possible to recover the last water texturing particles.

Thus, decanted water can advantageously be returned to the clean water reservoir 21 of the texturing system 20. To that end, the recovery system 40 includes a pump 44 able to force the decanted water taken from the last tub 43 through a set of filters 45 (self-cleaning) suitable for obtaining clean water that feeds the reservoir 21.

The set of filters 45 in particular makes it possible to eliminate the last impurities and the last particles present in the decanted water, pumped from the decanting tub 43.

Alternatively, the recovery system 40 includes a single decanting tub. The machine 10 also includes a control station, not shown in FIG. 1, allowing an operator to monitor and remotely control the various systems of the machine.

The machine described above has many advantages relative to the cleaning systems currently used:
- the quantity of water needed for washing is reduced;
- less residual washing water (water remaining on the walls of the vehicle or lost on the washing track, etc.) is lost, given the texturing properties of the water;
- the textured water is drained more effectively;
- less dirt is deposited in the inner lines of the recovery system 40;
- if chemical cleaning products (so, coagulant, etc.) are used, they are used in smaller quantities;
- the quality of the cleaning is improved, since once the vehicle is cleaned, it does not bear the white lines characteristic of a drying step, such a step being necessary in the machines of the prior art. These white lines are caused by the minerals from the water used. In the machines of the prior art, it is necessary to use demineralized water. With this machine, however, it is possible to use water that has not been demineralized. The machine is therefore simplified relative to those of the state of the art:
- the machine according to the invention does not include washing brushes, or more generally mechanical washing devices, which makes it possible to save on wearing parts of the machine. Furthermore, the body of the vehicle is not destroyed by the passage of the brushes.

The invention claimed is:

1. A washing machine for a railway vehicle, the washing machine comprising:
   - a water texturing system, mixing appropriate particles with water to produce textured water having super-hydrophoby properties, said appropriate particles being microbeads of fluorinated glass, lycopodiums, or soot; and
   - a textured water spraying system, fed by the water texturing system and using at least one appropriate spraying device to spray the textured water on a surface of a railway vehicle to be cleaned,
   - wherein the water texturing system includes a clean water reservoir and a particle container, as well as a water texturing machine capable of mixing a clean water supplied by the clean water reservoir with particles supplied by the particle container to produce the textured water, and
   - wherein the water texturing machine includes a tank, the bottom of which is filled with the clean water, and a drum, rotated using a motor, and one wall of which is provided with cells allowing the clean water to circulate between an inside and an outside of the drum, the particles being introduced from the container to the inside of the drum, the cells being smaller than the particles so as to keep the particles inside the drum.

2. The washing machine according to claim 1, wherein the textured water spraying system includes a plurality of spraying bars.

3. The washing machine according to claim 2, wherein each spraying bars includes an air spraying system to spray hot or cold air, optionally pulsed.

4. The washing machine according to claim 1, the washing machine having no mechanical washing means.

5. The washing machine according to claim 1, including a dirty textured water recovery system.

6. The washing machine according to claim 5, wherein the dirty textured water recovery system includes a decanting tub and a set of filters filtering a dirty water collected in the decanting tub to supply the water texturing system with the clean water.

* * * * *